(12) United States Patent
Peulen et al.

(10) Patent No.: US 6,222,640 B1
(45) Date of Patent: Apr. 24, 2001

(54) COPYING APPARATUS HAVING ADJUSTABLE GRADATION

(75) Inventors: Jacobus H. M. Peulen, Haelen; Petrus A. M. Cornelissen; Romeo M. Van Strijp, both of Venlo; Cornelis A. W. Ophelders, Echt, all of (NL)

(73) Assignee: OCE-Technologies, B.V., Venlo (NL)

( * ) Notice: Subject to any disclaimer, the term of this patent is extended or adjusted under 35 U.S.C. 154(b) by 0 days.

(21) Appl. No.: 09/108,199

(22) Filed: Jul. 1, 1998

(30) Foreign Application Priority Data

Jul. 4, 1997 (NL) .................................................. 1006472

(51) Int. Cl.[7] .................................................. H04N 1/407
(52) U.S. Cl. ........................................... 358/1.9; 358/455
(58) Field of Search ........................... 358/1.9, 455, 456, 358/501; 382/167, 169; 345/431, 154

(56) References Cited

U.S. PATENT DOCUMENTS

| | | |
|---|---|---|
| 3,893,166 | 7/1975 | Pugsley . |
| 4,402,015 | 8/1983 | Yamada . |
| 5,745,263 * | 4/1998 | Oryo et al. ............................. 345/154 |
| 5,838,455 * | 11/1998 | Imaizumi et al. ..................... 358/1.9 |
| 5,867,169 * | 2/1999 | Prater et al. .......................... 345/154 |
| 5,966,503 * | 10/1999 | van Vliembergen et al. ........ 382/167 |

FOREIGN PATENT DOCUMENTS

| | | |
|---|---|---|
| 1236377 | 6/1971 | (EP) . |
| 20-415722 | 3/1991 | (EP) . |
| 91 12540 | 8/1991 | (WO) . |

OTHER PUBLICATIONS

Paul M. Butterfield, "User–Oriented Approach to Control of Tone Reproduction for Electronic Reprographic Systems", SPIE vol. 1670 Color Hard Copy and Graphic Arts(1992)/ 513 pp. 512–520.

Paul M. Butterfield, "User–Oriented Approach to Control of Tone Reproduction for Electronic Reprographic Systems", SPIE vol. 1670 Color Hard Copy and Graphic Arts(1992) pp. 512–520.

Akira Inoue et al., "Adaptive Quality Improvement Method of Color Images", NEC Research & Development, vol. 35, No. 2, Apr. 1994, pp. 180–186.

* cited by examiner

*Primary Examiner*—Scott Rogers (57) ABSTRACT

A digital copying device with an adjustable reproduction characteristic. This characteristic maps optical densities ODin of an original document onto optical densities ODout of a copy that is to be made of the original. The device does the following: establishes the reproduction characteristic as having a first part which maps onto an optical density value representing the tone white, a second part which maps onto optical density values between the optical density value representing white and an optical density value representing the tone black, and a third part which maps onto the optical density value representing black, where the first part is piecewise continuous with the second part at a first shoulder point, A, and where the second part is piecewise continuous with the third part at a second shoulder point, B; generates first digital image data corresponding to an image of an original document; converts the first digital image data into second digital image data according to the reproduction characteristic; and prints the second digital image data. One or both of an optical density value ODin corresponding to the first and second shoulder points, respectively, is set based upon an operator selection. The device can also be applied to changing the contrast in copying, in which case the parameter for adjusting the reproduction characteristic is the luminance value in the digital image data.

26 Claims, 6 Drawing Sheets

COPYING APPARATUS HAVING ADJUSTABLE GRADATION

FIELD OF THE INVENTION

The invention relates to a method of making a copy of an original document in accordance with an adjustable reproduction characteristic.

BACKGROUND OF THE INVENTION

Generally, the reproduction characteristic of a copying apparatus has a three-part form, namely a first part which without distinction maps low optical densities on the original to the color white on the copy, a second part which with distinction maps grey tints to optical densities between white and black, and a third part which without distinction maps high optical densities, i.e., dark grey tints, on the original to the color black on the copy. The color black corresponds to the maximum optical density that can be supplied by the printing system.

Documents may differ considerably in the number of grey tints present, and it is frequently desirable to be able to optimize the reproduction of the grey tints by a copying apparatus for the type of document that has to be copied at any particular time. This can generally be achieved by using an adapted reproduction characteristic. In analogue copy apparatus (which makes a copy by charging a photoconductive medium, exposing imagewise with a projection of the document for copying, and developing the residual charge image with toner powder), it is possible to adapt the reproduction characteristic by adjusting the quantity of light used to make the projection. The reproduction characteristic shifts as a result and specific grey tints on the document which are reproduced without distinction under normal exposure, e.g. the dark tints, are now separately visible. This is usually at the expense of the distinctive reproduction of other grey tints, the lighter ones in this example.

With the advent of the digital copying machine it has become possible to treat grey tints as digital data and process them as such, with much less dependence on other grey tints. The present invention is aimed at this area of the art.

A method and apparatus having an adjustable mapping of optical densities are known from Paul M. Butterfield, "User-Oriented approach to control of tone reproduction for electronic reprographic systems", SPIE Vol. 1670, Color Hard Copy and Graphic Arts (1992), p.512–520. This document describes how a reproduction characteristic in the optical density domain can be adjusted by an operator. The reproduction characteristic is a graph indicating the relationship between input optical density ODin (on the X-axis) and output optical density ODout (on the Y-axis). According to Butterfield, a value on the Y-axis, i.e. an ODout value, can be adjusted by an operator at five approximately equidistant points on the X-axis. These ODout values are interconnected by straight lines and thus determine the reproduction characteristic. By determining five points an operator can define a complicated reproduction characteristic and hence very accurately control the reproduction of a document having a large number of grey tints.

The known method offers an operator very great freedom for programming the reproduction characteristic, but consequently requires a large number of adjustment operations, the effect of which cannot always be completely seen.

SUMMARY OF THE INVENTION

The invention, in part, reflects a recognition that an operator is usually only interested in satisfactory, moderate, or non-reproduction of specific dark or light tints. This can be achieved by influencing the location of the transitions between the above-mentioned first, second and third parts of the reproduction characteristic. The invention, also in part, also reflects a recognition that an adjustment of the form of the second part has hardly any influence on the result. With the known method according to Butterfield, it is possible to change the location of the transitions only indirectly, and then only with little accuracy.

An object of the invention is to provide a method and apparatus wherein simple and readily visible procedures enable a copy to be made with an adjustable reproduction characteristic. The invention provides, among other steps, the step of determining a reproduction characteristic.

A reproduction characteristic comprises a first part, which maps on white, a second part, which maps on density values between white and black, and a third part, which maps on black. The parts merge into one another in a first and second shoulder point respectively (A, B). An input optical density ODin value for at least one shoulder point is selected on the basis of specification by an operator.

According to the invention, therefore, only two adjustment points, namely the shoulder points, are offered to the operator for adjustment, and they can be shifted over the X-axis (ODin). These two points are necessary and sufficient to achieve the required result of an adjustable gradation when they are shifted over the X-axis.

According to one embodiment of the method according to the invention, the step of processing the first digital image data and the generation of second digital image data in so doing is performed using a predetermined transfer function, which has a form such that ODin values are mapped on ODout values in accordance with the reproduction characteristic as determined, wherein the method also comprises calculating a transfer function in accordance with the reproduction characteristic specified by an operator.

The values of the two shoulder points to be set by the operator can be specified as absolute values or as a change of an automatically set default. In the latter embodiment, the step of determining a reproduction characteristic on the basis of specification by an operator comprises: first determining a default reproduction characteristic on the basis of the first digital image data and determining a final reproduction characteristic on the basis of a change of the ODin value of at least one of the shoulder points as specified by the operator. Having a default can facilitate the operator's work, because it is then possible to assume that there is a setting that has already been optimized, and to which then changes, usually minor changes, need be applied.

The present invention is not limited to black-and-white copying, but can also very well be used for changing the contrast in color copying. It would, however, not be practical to have the operator adjust the individual color channels for red, green and blue, or cyan, magenta and yellow, because there would be a chance that the color tone would be affected, which is of course not intended. Rather, it is preferable to use the luminance comprised in the digital image data generated by the scanner, as the parameter for adjusting the reproduction characteristic.

The luminance, as defined in the L-a-b or the L-C-H coordinate systems, both widely known, is a perceptual parameter defining the light/dark character of an image, and is therefore a good choice for an adjustment parameter. Moreover, it has, just like the optical density in black-and-white copying, a more or less logarithmic course, so that the reproduction characteristic in L is also linear. Therefore, the theory applied to the optical density OD in the black-and-white case, also applies to the luminance in color copying, with no substantial differences.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein . . .

DETAILED DESCRIPTION OF THE PREFERRED EMBODIMENTS

Figure 1:
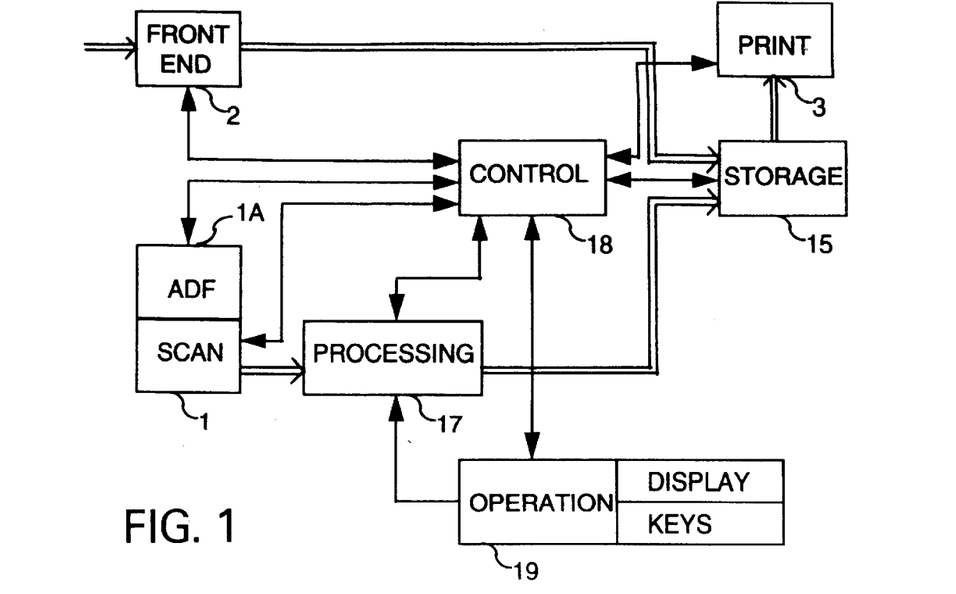
FIG. 1 is a diagrammatic general view of an apparatus according to the invention.

FIG. 1 shows the general lay-out of an image reproduction apparatus according to the invention. This apparatus comprises a scanner 1 for electro-optical scanning of a document and delivery of corresponding digital image data, an automatic document feeder 1A, a processing unit 17 for image data delivered by the scanner 1, a front end 2 for receiving image data from an external source such as a network, and a printing unit 3 for printing digital image data on a support material.

The apparatus also comprises a storage device 15 for image data, connected to the processing unit 17, the front end 2 and the printer 3, and operative as a buffer between the parts 1 and 2 which generate the print data and part 3 of the apparatus which processes the print data, and also an operating unit 19 provided with an operating panel and a display screen and keys, connected to the processing unit 17. Finally there is a central control unit 18 connected to all the other elements.

Figure 2:
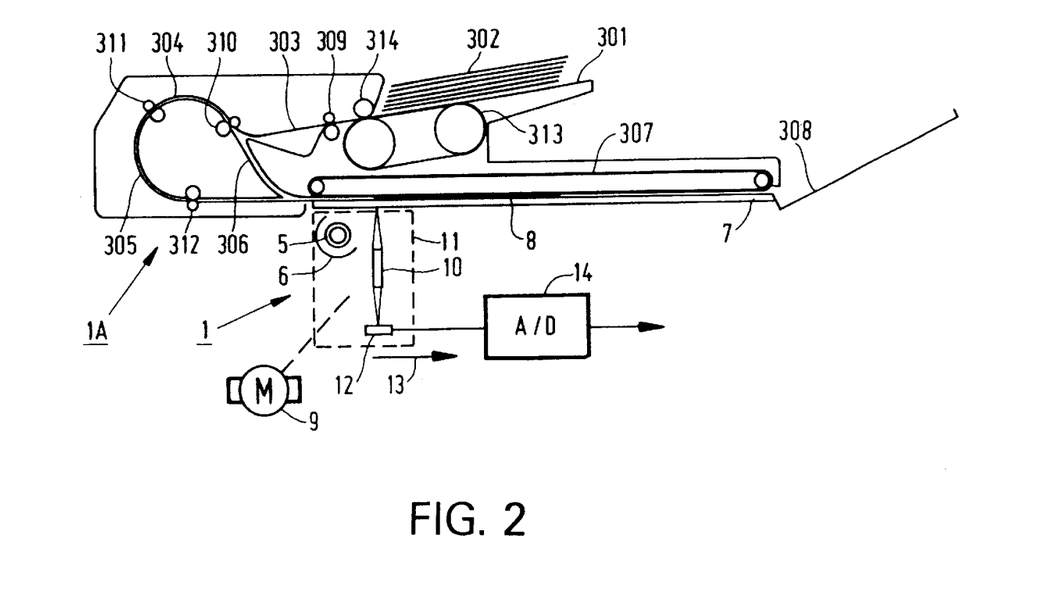
FIG. 2 shows a scanner device provided with an automatic document feeder for use in the apparatus.

The scanner 1 is shown in greater detail in FIG. 2. It comprises a tubular lamp 5 and a reflector 6 cooperating therewith, by which a narrow strip of a document 8 placed on a glass platen 7 is exposed. The scanner also comprises an array 10 of imaging glass fibres (a "selfoc" lens array), by which the light reflected by the document is projected on to a sensor array, e.g. a CCD array 12. The lamp 5, reflector 6, selfoc lens array 10 and CCD array 12 are combined on a carriage 11 which during scanning is moved by a servo motor 9 at uniform speed in the direction of the arrow 13 so that the document 8 is scanned line-by-line by the CCD array 12. The position of the carriage 11 is continuously measured by a known technique and used, inter alia, for the feedback circuit of the servo motor 9.

In this way each image dot of the document is converted to an analogue signal corresponding to the grey value of that dot. The analogue signal is then converted by an A/D converter 14 into a digital signal for each image dot.

The scanner 1 is equipped with an automatic document feeder (ADF) 1A. This comprises a tray 301 for receiving a stack of documents 302 for copying, a separating mechanism 313, 314 for removing documents one by one from the bottom of the stack, and a transport mechanism consisting of the transport paths 303, 304, 305, 306 and transport roller pairs 309, 310, 311, 312, for transporting a removed document to the platen 7. The document 8 is transported over the platen 7 by a conveyor belt 307, which after scanning by the scanning carriage 11 transports it to the delivery tray 308.

Figure 3:
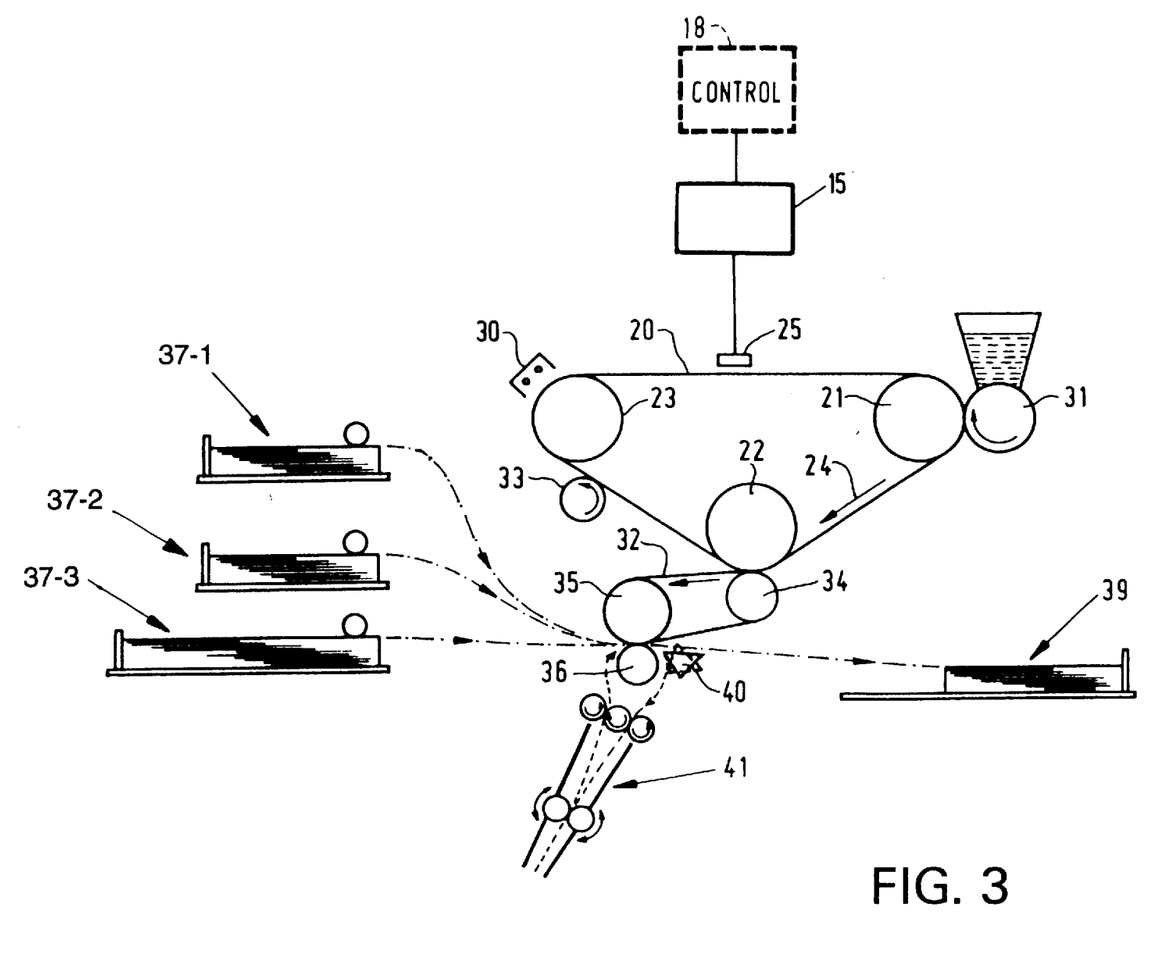
FIG. 3 shows a printer unit for use in the apparatus.

Reference will now be made to FIG. 3 for a description of the printer 3. The printer comprises an endless photoconductive belt 20 which is advanced in the direction of arrow 24 at uniform speed by drive and guide rollers 21, 22 and 23 respectively.

According to the processed image data offered by device 15, an LED array 25 is so activated that the photoconductive belt 20 after being electrostatically charged by a corona device 30 is exposed image-wise line-by-line.

The latent charge image forming on the belt 20 as a result of the exposure is developed by a magnetic brush device 31 with toner powder to form a toner image which in a first transfer zone is then brought into contact under pressure with an endless intermediate medium belt 32 made of or covered with an elastic and heat-resistant material, such as silicone rubber. In these conditions the toner image is transferred by adhesion forces from the belt 20 to the belt 32. After this image transfer, any remaining toner powder residues are removed from the photoconductive belt 20 by a cleaning device 33, whereafter said belt 20 is ready for re-use.

The intermediate medium belt 32 is trained over drive and guide rollers 34, 35, the intermediate medium belt 32 being heated to a temperature above the softening temperature of the toner powder, e.g. by an infrared radiant heater disposed inside roller 35. While belt 32 with the toner image thereon is being advanced, the toner image becomes sticky as a result of the heating.

In a second transfer zone between the belt 32 and a pressure roller 36 the sticky toner image is transferred under the influence of pressure and simultaneously fixed on a copy sheet which is supplied from one of the reservoirs 37-1, 37-2 or 37-3.

The copy thus obtained can finally be deposited in a delivery tray 39 or be fed by a deflector element 40 (placed in the broken-line position indicated) to an inverting device 41. In this inverting device 41 in which the copy sheet is turned over, whereafter it is then again fed to the second transfer zone between the belt 32 and the pressure roller 36 in order to be printed with a powder image on the other side in this transfer zone and then be deposited in the delivery tray 39.

Documents may differ in character considerably. For example, text documents usually contain black characters on a white background and no or hardly any grey tints. During the scanning thereof, however, signals corresponding to grey tints are also generated either because the scanner has just measured a transition between a character and the background or because there are stains on the document. It is usually desirable that a copy of a text document should not contain grey tints, and hence that any grey image dots present in the scanner signals should be eliminated. However, when an original document is or contains a photograph, there are also many grey dots in addition to black and white dots. For good reproduction on a copy, it is precisely necessary for such original documents that grey areas in the document should be reproduced as grey areas on the copy. The reproduction system requirements therefore depend on the nature of the original and may differ considerably for different original documents.

The reproduction system can be described by a reproduction characteristic in which the optical density of the copy (ODout) is indicated as a function of the optical density (ODin) on the original document.

Figure 4:
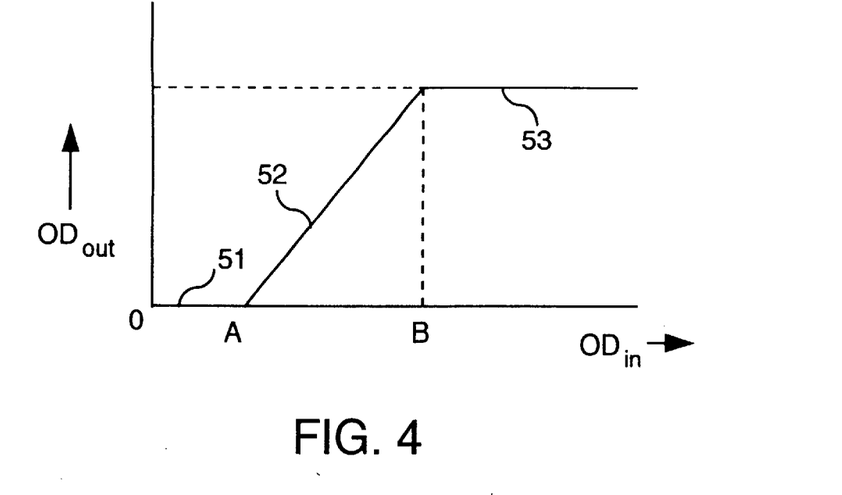
FIG. 4 shows a reproduction characteristic.

FIG. 4 shows an example of a reproduction characteristic of this kind. It consists of three parts, namely a part 51 for an ODin between 0 and a value A, a part 52 for an ODin between a value A and a value B, and a part 53 for an ODin greater than a value B. In this description the value "0" denotes white.

In part 51 ODout has the value 0 so that light grey values of the background, for example because the original document is yellowed paper or because text at the back of the original document passes through to the front, is nevertheless printed with a white background on the copy. In part 53, the maximum optical density ODmax of the printing system is reached, so that all higher values of ODin are mapped on this value ODmax.

Part 52 has a linear form and describes the mapping of grey to black tints of the original document on values of the ODout. In the apparatus described here, the linear form of part 52 of the characteristic in the OD domain is intentionally selected. The optical density (OD) is a logarithmic measurement of the quantity of light reflected by a document and corresponds to the human perception, which is also logarithmic. Due to the linear form of the reproduction characteristic identical differences in perceived grey tints on the original document are imaged on identical differences in perceived grey tints on the copy.

Figure 5:
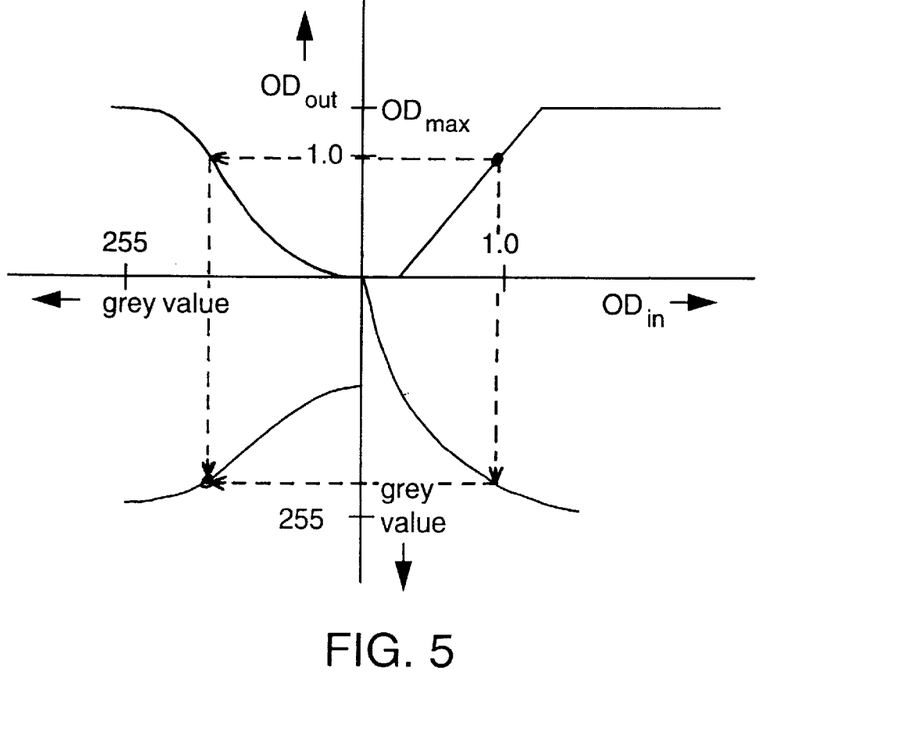
FIG. 5 is a diagram of the imaging characteristics of the sub-systems of the apparatus.

As already described, the reproduction system is composed of different parts, namely a scanner 1, an image processing unit 17 and a printing apparatus 3. These all have their own imaging characteristic. The combination of these imaging characteristics gives the reproduction characteristic of the system. This is shown in FIG. 5, which illustrates the imaging characteristics and the reproduction characteristic of the system in four quadrants. The origin of this graph corresponds to the value "0", i.e. "white".

Quadrant I contains the reproduction characteristic of the system. Quadrant II contains the imaging characteristic of the scanner 1 and gives an (8-bit) grey value for each value of the optical density ODin of the original document. This characteristic is sharply curved, because the optical density is a logarithmic quantity while the grey-value scale is linear.

Quadrant IV contains the imaging characteristic of the printing apparatus 3 and indicates an optical density ODout on the printed copy for each grey value generated by the image processing unit 17.

Quadrant III contains the imaging characteristic of the image processing unit 17 and gives for each grey value generated by the scanner a grey value which should be produced by the printing system 3. As already stated, the latter grey value is in fact embodied by a pattern of black and white image dots.

Since the imaging characteristics of the scanner 1 and the printing system 3 are determined by the technology and are fixed for the apparatus once it is constructed, the image processing unit 17 should be provided with an imaging characteristic such that an acceptable system reproduction characteristic is obtained. By reprogramming the image processing unit 17 it can also be made possible to change the reproduction characteristic of the system.

Figure 6:
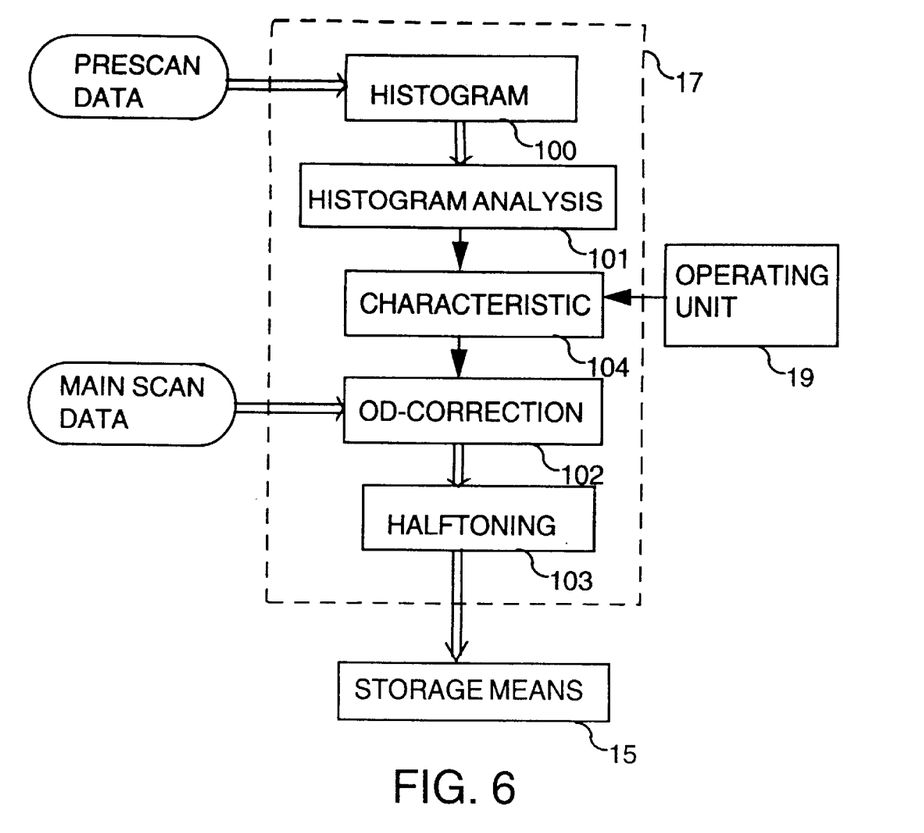
FIG. 6 is a block diagram of the image processing module of the apparatus.

FIG. 6 shows a block diagram of the image processing module 17 for converting the digital signals from the scanner into binary image data suitable for controlling the printing system. This module comprises a histogram module 100, provided with an input for signals from the scanner 1, an analysis module 101 connected to the histogram module 100, a characteristic calculation module 104 connected to the analysis module 101, an OD correction module 102 connected to the module 104 and to the operating unit 19 and also having an input for signals from the scanner 1, and also a half-tone module 103 connected to the OD correction module 102 and to the storage device 15. The function of the histogram module 100 and the analysis module 101 is to characterize an original document as being a text or photographic document respectively. The OD correction module 102 provides for imaging of grey values generated by the scanner on to grey values to be produced by the printing system. This imaging corresponds to quadrant III in FIG. 5. Finally, the half-tone module 103 serves to convert the grey values specified by the OD correction module 102 into image dot values (which, as already described, may be "white" or "black") to control the printing system 3. The operation of the said modules is described hereinafter.

The scanning of a document on the platen takes place in two stages. In the first stage, the prescan stage, the scanning carriage 11 moves along the document 8 and in so doing delivers digitized signals corresponding to the measured optical density of a first raster of image dots of the document image. These signals are used to characterize the type of document, so that an adapted processing of the scanner data can be selected. In the second stage or main scan stage, the scanning carriage 11 moves along the document 8 in the opposite direction and again delivers digitized signals, this time corresponding to the measured optical density of a second raster of image dots of the document image. The first and second rasters may be identical but the first raster may also be coarser, so that less image dots are measured.

Figure 7A:
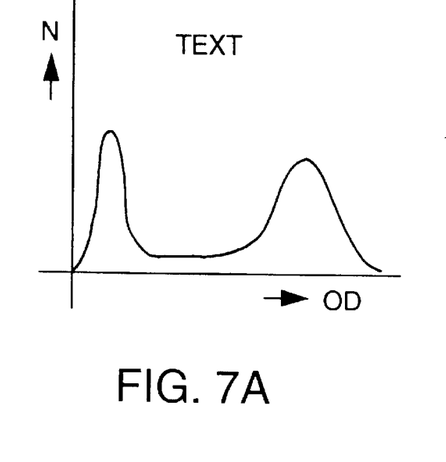
FIGS. 7A and 7B are characteristic histograms.
Figure 7B:
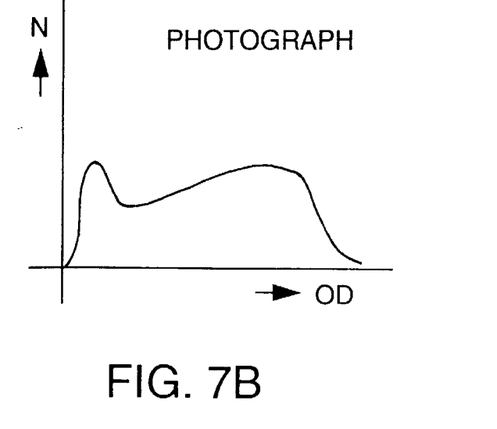

The scanner signals from the prescan are delivered to the histogram module 100, which makes a histogram of the measured values. On completion of the prescan, the results of the histogram module are passed for analysis to the analysis module 101. The latter characterizes the scanned image as a text image or a photographic image. FIG. 7A shows a characteristic histogram for a text image and FIG. 7B a characteristic histogram for a photographic image. The optical density OD is plotted along the abscissa and the number of image dots (N) along the ordinate. A text image contains two relatively narrow and tall peaks corresponding to the white of the paper and the black of the characters. Grey values therebetween do not occur frequently and originate mainly from image dots which are just situated at the edge of a character. In contrast, the histogram of a photographic image contains a large number of grey dots and fewer white and black dots. The analysis module now determines by reference to pre-programmed criteria whether the histogram recorded belongs to the text type (with two distinct peaks) or to the photographic type (with a more continuous distribution). This decision is passed to the characteristic calculation module 104. This module is so arranged that on the basis of a required reproduction characteristic for the system and the known imaging characteristics of the scanner and the printing unit, corresponding consecutively to the quadrants I, II and IV in FIG. 5, it can calculate an imaging characteristic for quadrant III by combining the characteristics. This calculation is shown graphically with broken arrows in FIG. 5. The calculated imaging characteristic is then passed to the OD correction module 102.

In this exemplified embodiment, the classification of the original document is restricted to two types, text and photographic. It is also possible to distinguish a larger number of types on the basis of the distribution of grey values in the histogram.

In the OD correction module 102, the grey values from the digitized scanner signals from the main scan are converted into other grey values, in accordance with an imaging characteristic calculated by the characteristic calculation module 104. For this purpose, a look-up table (LUT) is programmed with the values of the imaging characteristic. The scanner data are then converted by the LUT.

Figure 8:
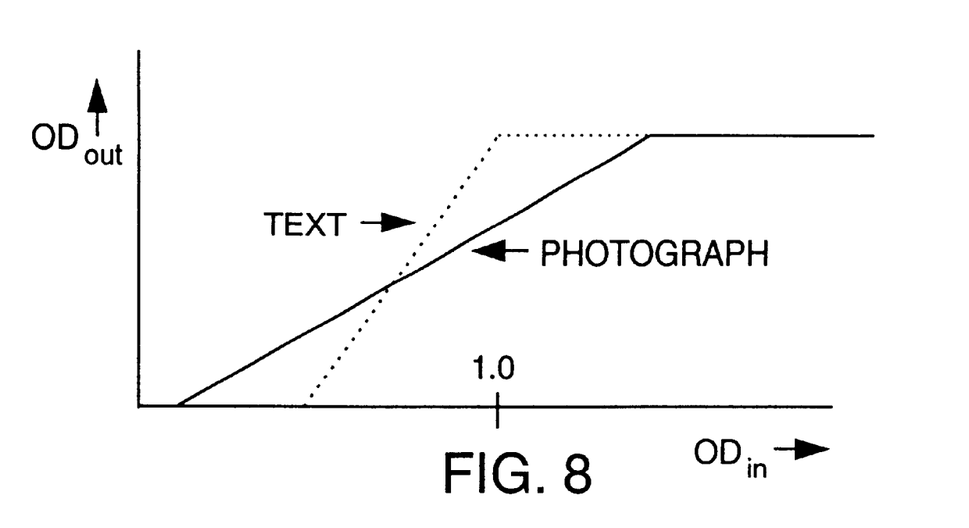
FIG. 8 shows two different reproduction characteristics.

FIG. 8 shows one example of the reproduction characteristics for a text image and a photographic image respectively. It will be seen that a text image is imaged hard, i.e., light tones are made white and darker tones black, while only a small number of middle tones are reproduced as grey. The effect of this is that the resulting printed image contains primarily black on white, as is usually also the intention with a text image. On the other hand, a photographic image is reproduced much more softly. The characteristic maps most grey tones on grey tones and only a relatively small number of grey tones at the ends of the range is converted to white and black respectively.

When the analysis module 101 finds that the original document is of the text type, the reproduction characteristic for text in FIG. 8 is chosen as the basis for calculating the imaging characteristic of the image processing unit 17, and in the case of a photographic original the reproduction characteristic for a photographic image in FIG. 8 is chosen.

The reproduction characteristic chosen now serves as a basis for making the copy, but can be adapted by an operator if he has special requirements in respect of the reproduction of specific optical densities of the original document. For this purpose, using the keys and the display screen on the operating panel of the operating unit 19 the operator can shift the ODin values A and B (see FIG. 5) which define the linear part of the characteristic and which have been preselected by the OD correction module 102, the shift preferably being in steps of equal OD intervals. Shifting point A in the direction of 0 delivers a more differentiated reproduction of light tints, and moving point B from 0 gives a more differentiated reproduction of darker tints. In addition, an equal shift of the two points A and B in the same direction gives a lighter and darker copy respectively. The latter is equivalent to the conventional light/dark setting, so that there is no need for any extra button for this purpose on the operating panel.

It has been found that good operation is achieved with an adjustability of points A and B in steps of about 0.01 (OD).

In practice it has been found that operators particularly with experience in the graphic industry obtain excellent results without difficulty using this method of operation.

If a copy order contains a number of original documents, they are placed one by one on the platen 7 by the feeder 1A and a prescan and a main scan are carried out for each document. Thus a reproduction characteristic is selected for each document. The adjusted shift of the points A and B is retained during the entire copy order and hence adapted each time to the selected characteristic. The adjusted shift can be reset by the operator and also returns to 0 when the apparatus is unused for a predetermined time.

In a second embodiment, the adjustment of the reproduction characteristic can also be left completely to the operator. In that case, the prescan for the characterizing of the original document is omitted and the histogram module 100 and the analysis module 101 are omitted. In this case the operator must adjust the OD in values A and B absolutely. This embodiment admittedly requires considerable experience on the part of the operator, but gives a gain in production speed because no prescan is required.

In this embodiment too, the adjusted values A and B are retained during the entire copy job. They can be reset by the operator and also return to zero when the apparatus is out of use for a predetermined time.

The operation will be described in detail hereinafter.

The grey value image data converted in the OD correction module 102 are then converted in the half-tone module 103 to binary data which contain binary values of the image dots for controlling the printing unit 3, in accordance with a known half-toning technique. The dither technique or the error diffusion technique or a mixed form thereof may be used for this for example. These techniques are fully described in the literature and are therefore not explained further, particularly also since the half-toning technique used is irrelevant to the present invention.

The effects of the half-tone processing on the optical density finally produced by the printing unit 3 on the copy are comprised in the printer characteristic in FIG. 5 (quadrant IV). Due to a difference in location strategy of black image dots, different half-tone processing techniques often have different relationships between the number of black image dots printed and the optical density on the copy. These differences are regarded as a system property. Quadrant III in FIG. 5 thus relates to the signals generated by the OD correction module 102.

The binary image data are now suitable for processing by the printing unit 3 of the apparatus. In preparation for this they are stored in the storage device 15, in compressed form if required.

Figure 9:
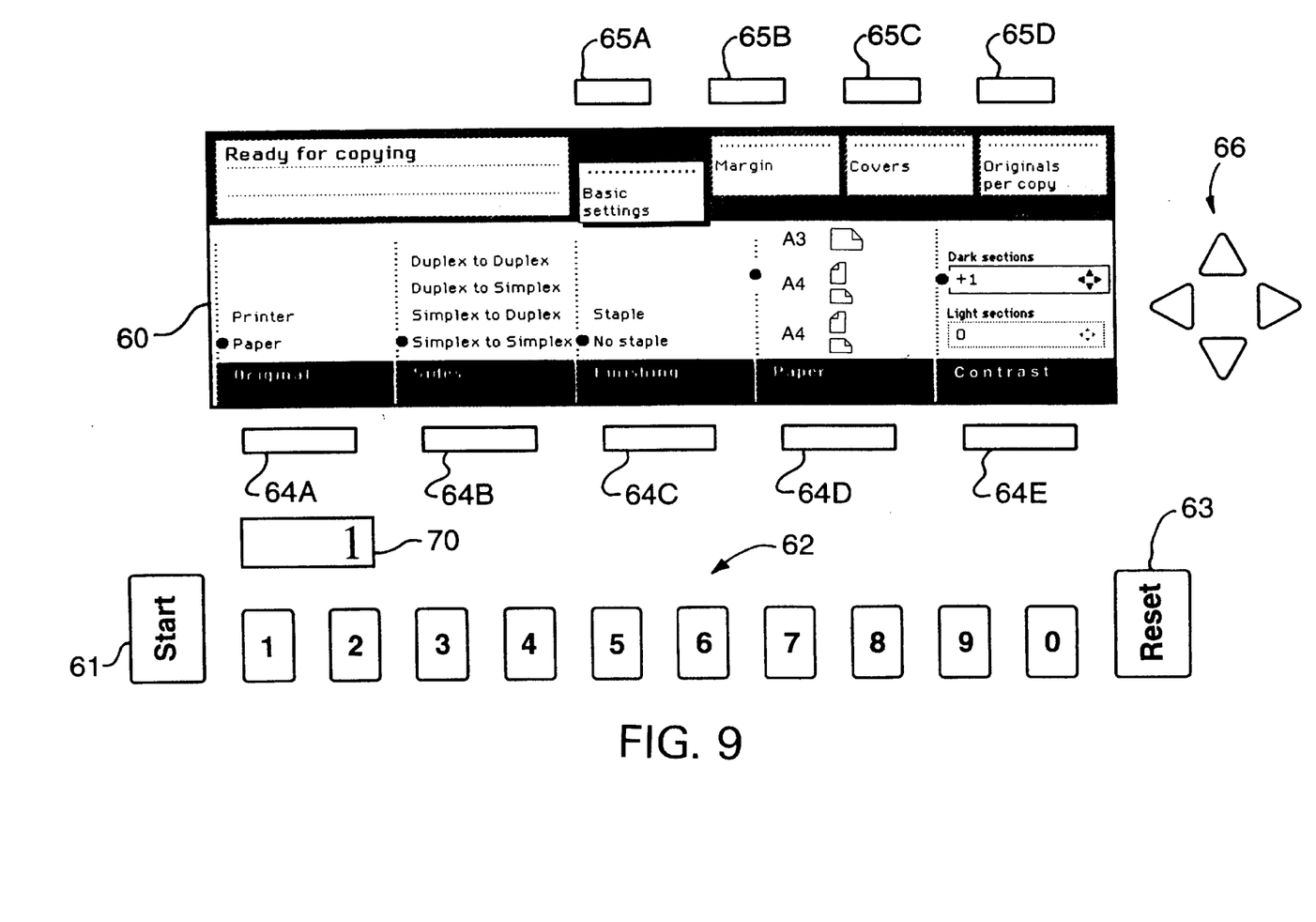
FIG. 9 is an illustration of the apparatus operating panel.

The operating panel associated with the operating unit 19 is shown in FIG. 9 and comprises a display screen 60, such as an LCD display, and a number of keys, namely a start key 61, number keys 62, correction key 63, selection keys 64A–E, 65A–D and the key cluster 66. The operating panel also contains a number display 70 for displaying the number of prints set, as is conventional on copying machines. All these elements are connected to the operating unit 19, which in response to operation of the keys passes signals to the control unit 18 and which also controls the display screen 60 to show options and messages to the operator.

When the apparatus is switched on, the display screen 60 shows an image formed by a number of vertical columns each above one of the selection keys 64A–E. Each column relates to a specific basic function of the apparatus and indicates the various possible settings of that basic function. For example, the column on the extreme left is allocated to the choice between the copying function, in which a document is scanned by the scanner and then reproduced, and the printer function in which a print is made in accordance with digital image data fed via the network connection. The setting selected at any time, in this case the copying function, is indicated by a marker, such as a dark dot, or by highlighting.

By actuating a selection key an operator can choose a different setting, e.g. in accordance with a cyclic pattern. As a result of a change of a setting the function of one or more of the other selection keys may change, because the old function is no longer relevant and other selection options may be required. Different text relating to the new function then appears in the associated column of the display screen 60.

The selection keys 65A–D offer the possibility of calling up a different set of functions (group). Generally, these are functions which are not required for a simple copying or printing order, but which offer the operator more possibilities of obtaining special printing results. In this example, these functions comprise shifting the margin on the print, adding covers and multiple up. The meaning of the keys 65A–D is indicated in an associated field in the display screen 60 directly beneath each key. When one of the keys is actuated, the corresponding set of functions is activated and the lay-out of the display screen 60 is adapted to the relevant functions. At the same time, this selection is displayed by emphasizing—in this example by a slight shift—the field on the display screen 60 associated with the actuated key of the group 65A–D.

The columns above the keys 64A (already mentioned) and 65B (simplex or duplex, both with respect to the original document and to the copy sheet), 64C (stapling) and 64D (choice of format and orientation of printing paper) relate to the finishing of the order.

The column above key 64E is intended for specifying a reproduction characteristic. This column contains two entry fields, one for the value A in the reproduction characteristic and one for the value B therein. By way of a key 64E one or other field and hence the associated operation can be activated, and this is shown by the dark dot.

As described above with reference to FIG. 4, the value A determines the transition from the white-reproducing part and the grey-reproducing part of the reproduction characteristic. Shifting A to the value 0 provides an increase in contrast in the light sections of the copy, while conversely shifting A from the value 0 results in a shift of the contrast in the light sections.

The value B determines the transition from the grey-reproducing part and the black-reproducing part of the reproduction characteristic, and a shift of B from the value 0 therefore results in an increase, and a shift of B to 0 results in a reduction, in contrast in the dark sections of the copy.

In the A and B entry fields a number indicates the difference from the value preselected by the characteristic calculation module 104, in steps of 0.01 OD, a positive number referring to an increase in contrast and a negative number to a reduction thereof.

In the case of the said exemplified embodiment in which the value of A and B is adjusted absolutely, this absolute value is shown directly in OD units. This is not shown in a drawing.

In the active field, the top one in the example of FIG. 9, the adjustment can be changed by way of the keys of the cluster 66. This is shown to the operator by an emphasized star symbol.

The setting selected is passed to the processing module 17, more specifically the characteristic calculation module 104, which in response thereto calculates an imaging characteristic for quadrant III in FIG. 5 so adapted that the final reproduction characteristic of the entire system receives the form set by the operator. The procedure for this is described in the foregoing.

In an alternative embodiment, the column above key 64E could also contain one entry field for one of the connection points in the reproduction characteristic at the ODin values A or B, preferably the one at value A, and one entry field for the slope of the middle part of the reproduction characteristic, e.g., in the form of a percentage (refer to FIG. 4). These values together define the two values A and B unambiguously, because the ODout values corresponding to A and B are constants for the printing device (minimum and maximum print density). Upon entry of a value A or a value B, and the slope, the characteristic calculation module 104 first calculates the other of the values A and B, and then the imaging characteristic. An entry according to this second embodiment should be considered a form of entering the values A and B.

The invention described above can also be used for color copiers. These systems usually have three color channels, viz. red, green and blue (R-G-B), for the scanning, image processing and printing. However, in many cases it would be preferable to offer to the operator a single parameter for optimizing the reproduction of "difficult" originals. Especially for making a lighter or darker copy, the colors should not be changed, and changing the reproduction characteristics of the individual color channels separately would almost always result in a change of the color on the copy.

However, there are other color coordinate systems, e.g. L-a-b and L-C-H, in which a perceptual parameter (L) for the luminance is defined, which more closely corresponds to the light-dark impression of an image. In these systems, the luminance can be changed independently of the color tone.

The invention makes use of this effect in such a way, that, instead of the optical density (OD) in black-and-white copying, now the luminance contained in the digital image data is presented for changing by the operator. As the luminance is, just like the OD, a perceptual parameter, it is a more-or-less logarithmic one, and the reproduction characteristic has a linear form. Therefore, the theory discussed in the black-and-white case above, applies to the luminance in color copying with no substantial differences.

In a first form, which is most straightforward, the R-G-B scanner data are first transformed to the L-a-b domain, converted there using the reproduction characteristic, and then converted back to the R-G-B domain for controlling the printer. In this operation, only the light/dark balance is changed, while the color tone remains unaffected. A slight drawback of this implementation is, that the conversions between the different color coordinate systems, although generally known (and therefore not described here), are quite complex, and can only be done when a sufficiently powerful computer is available for the conversions.

In a second form, the changes selected by the operator on the characteristic in the L-C-H domain are translated into a direct operation on the R-G-B scanner data (i.e., an operation within the R-G-B domain). This translation is not exact (otherwise it would be as complex as the operation in the first form described hereinabove), but normally it gives quite acceptable results. According to this implementation, the slope of the second, intermediate part of the input-output characteristic of the three color channels is changed with the same factor F. This corresponds to a change by a factor f, of the slope of the characteristic in the L domain, such that $f^3=F$. Thus, a shift of the shoulder point for light sections, as selected by the operator, is translated into a change F of the slope of L characteristic, which in turn is translated into a change f of the characteristics of the color channels. The change of the slope of the color channel characteristics has the effect, that also C (chroma) is changed by a multiplication with same factor f. However, the parameter H (hue), which most prominently determines the color impression, is not affected.

The operation described above for the second form of the contrast manipulation in color copying, affects the position of the shoulder point for the light sections of the original document. In this embodiment, the shift of the other shoulder point, the one for the dark sections, is also defined as an equal shift of the values of the R, G and B scanner signals. However, this shift of the latter shoulder point does not leave the color entirely unaffected, and therefore should be used prudently, balancing the effect on the hue (H) and that on the contrast. A change of the hue in dark sections is less noticeable, though, and may therefore still be preferred over more complex methods.

The implementation details described for the black-and-white version of the invention are also applicable for the color version. These include at least the automatic characterisation of the original document by a pre-scan or otherwise, and either using the results thereof as a starting point for adjustment, by the operator, of the reproduction characteristic, or defining a reproduction characteristic by the operator without using the automatic characterisation results. Also, the presentation, on the operating panel, of the adjustment mechanism can without problem be used for color copying, as it refers to the luminance which is also a measure for "dark" and "light".

Once a reproduction characteristic has been selected, it can be programmed into a look-up table (LUT) for processing the scanner data therewith. Using a LUT for data processing is a commonly used method in color copying and therefore is not explained in detail here.

The invention has been described above with reference to one exemplified embodiment. It will be clear to the skilled man that other embodiments are possible within the scope of the following claims. For example, in addition to the two embodiments described in which the adjustment of the reproduction characteristic is made as a change to an automatically preselected characteristic or as an absolute input respectively, another embodiment is possible in which an operator can optionally use one of the two methods of adjustment. It is also feasible for a reproduction characteristic set in the first embodiment (specified as a change) to be made "absolute" by the operator using the operating interface and thus remain valid for all subsequent original documents of a set, even if the characteristic calculation module tends to select a different setting for one or more of the original documents.

What is claimed is:

1. A method of making a copy of an original document according to an adjustable reproduction characteristic that maps optical densities ODin of an original document onto optical densities ODout of a copy thereof, the method comprising the steps of:
establishing said reproduction characteristic as having a first part which maps onto an optical density value representing white, a second part which maps onto optical density values between said optical density value representing white and an optical density value representing black, and a third part which maps onto said optical density value representing black,
said first part being piecewise continuous with said second part at a first shoulder point, A, and said second part being piecewise continuous with said third part at a second shoulder point, B,
an optical density value ODin being independently set by an operator selection for each of said first and second shoulder points;
generating first digital image data corresponding to an image of an original document;
converting said first digital image data into second digital image data according to said reproduction characteristic; and
printing on an image support according to said second digital image data.

2. The method according to claim 1, further comprising calculating, on the basis of said operator selection, a transfer function that maps ODin values onto ODout values;
wherein said step of converting converts said second data by applying said transfer function thereto.

3. The method according to claim 2,
wherein said transfer function is provided by combining a characteristic of said generation process for first digital image data, a characteristic of the said printing process on the basis of the second digital image data and said reproduction characteristic.

4. The method according to claim 1, wherein said step of establishing said reproduction characteristic includes:
determining a default reproduction characteristic on the basis of an automatic analysis of the first digital image data and
adjusting at least one of an optical density ODin corresponding to said first should point A and said second shoulder point B, respectively, of said default reproduction characteristic according to said operator selection.

5. The method according to claim 1, wherein said said second part of said reproduction characteristic is substantially linear.

6. The method according to claim 4, wherein said optical density values corresponding to said first and second shoulder points, respectively, are adjustable in predetermined equal increments.

7. The method according to claim 6, said predetermined equal increments are 0.01 OD.

8. A method of making a copy of an original document according to an adjustable reproduction characteristic for a coordinate system having luminance as a parameter,
said reproduction characteristic mapping input luminance values of an original document onto output luminance values of a copy thereof,
the method comprising the steps of:
establishing said reproduction characteristic as having a first part which maps onto an output luminance value substantially corresponding to white, a second part which maps onto output luminance values between said luminance value substantially corresponding to white and a luminance value substantially corresponding to black, and a third part which maps onto said output luminance value substantially corresponding to black,
said first part being piecewise continuous with said second part at a first shoulder point, A, and said second part being piecewise continuous with said third part at a second shoulder point, B,
an input luminance value being independently set by an operator selection for each of said first and second shoulder points;
generating first digital image data corresponding to an image of an original document;
converting said first digital image data into second digital image data according to said reproduction characteristic; and printing on an image support according to said second digital image data.

9. The method according to claim 8,
wherein said first digital data and said second digital data are defined in the R-G-B color coordinate system;
wherein said step of converting said first digital image data into said second digital image data in accordance with said reproduction characteristic includes:
 a) converting pixel values of said first digital data into first L-H-C pixel values in the L-C-H coordinate system;
 b) converting said L-C-H pixel values in accordance with said reproduction characteristic into second L-C-H pixel values; and
 c) converting said second L-C-H pixel values into said second digital data in said R-G-B coordinate system.

10. The method according to claim 8,
wherein said first digital data and said second digital data are defined in the R-G-B coordinate system,
wherein said step of converting said first digital image data into said second digital image data in accordance with said reproduction characteristic converts in said R-G-B coordinate system.

11. The method according to claim 8, wherein said step of establishing said reproduction characteristic includes:
 determining a default reproduction characteristic on the basis of an automatic analysis of the first digital image data and
 adjusting at least one of an input luminance value corresponding to said first shoulder point A and said second shoulder point B. respectively, of said default reproduction characteristic according to said operator selection.

12. The method according to claim 8, wherein said second part of said reproduction characteristic is substantially linear.

13. A digital copying apparatus for making a copy of an original document according to an adjustable reproduction characteristic that maps optical densities ODin of an original document onto optical densities ODout of a copy thereof, the apparatus comprising:
 characteristic means for establishing said reproduction characteristic as having a first part which maps onto an optical density value representing white, a second part which maps onto optical density values between said optical density value representing white and an optical density value representing black, and a third part which maps onto said optical density value representing black,
  said first part being piecewise continuous with said second part at a first shoulder point, A, and said second part being piecewise continuous with said third part at a second shoulder point, B,
  an optical density value ODin being independently set by an operator selection for each of said first and second shoulder points;
 a scanner for generating first digital image data corresponding to an image of an original document;
 conversion means for converting said first digital image data into second digital image data according to said reproduction characteristic; and
 a printing device for printing on an image support according to said second digital image data.

14. The apparatus according to claim 13, further comprising calculating means for calculating, on the basis of said operator selection, a transfer function that maps ODin values onto ODout values;
wherein said conversion means converts said second data by applying said transfer function thereto.

15. The apparatus according to claim 14,
wherein said calculating means calculates said transfer function by combining a characteristic of said scanner for first digital image data, a characteristic of the said printing device on the basis of the second digital image data and said reproduction characteristic.

16. The apparatus according to claim 14, wherein said calculating means includes a look-up table for storing said transfer function.

17. The apparatus according to claim 13, wherein said characteristic means includes:
 analysis means for determining a default reproduction characteristic of the first digital image data; and
 adjustment means for adjusting at least one of an optical density ODin corresponding to said first should point A and said second shoulder point B, respectively, of said default reproduction characteristic according to said operator selection.

18. The apparatus according to claim 13, wherein said second part of said reproduction characteristic is substantially linear.

19. The apparatus according to claim 13, wherein said optical density values ODin corresponding to said first and second shoulder points, respectively, are adjustable in predetermined equal increments.

20. The apparatus according to claim 19, wherein said predetermined equal increments are 0.01 OD.

21. A digital copying apparatus for making a copy of an original document according to an adjustable reproduction characteristic for a coordinate system having luminance as a parameter,
 said reproduction characteristic mapping input luminance values of an original document onto output luminance values of a copy thereof,
 the apparatus comprising:
  characteristic means for establishing said reproduction characteristic as having a first part which maps onto an output luminance value substantially corresponding to white, a second part which maps onto output luminance values between said luminance value substantially corresponding to white and a luminance value substantially corresponding to black, and a third part which maps onto said output luminance value substantially corresponding to black,
   said first part being piecewise continuous with said second part at a first shoulder point, A, and said second part being piecewise continuous with said third part at a second shoulder point, B,
   an input luminance value being independently set by an operator selection for each of said first and second shoulder points;
  a scanner for generating first digital image data corresponding to an image of an original document;
  conversion means for converting said first digital image data into second digital image data according to said reproduction characteristic; and
  a printing device for printing on an image support according to said second digital image data.

22. The apparatus according to claim 21,
wherein said first digital data and said second digital data are defined in the R-G-B coordinate system;
wherein said conversion means is operable to convert pixel values of said first digital data into first L-H-C pixel values in the L-C-H coordinate system, to convert said L-C-H pixel values in accordance with said reproduction characteristic into second L-C-H pixel values; and to convert said second L-C-H pixel values into said second digital data in said R-G-B coordinate system.

23. The apparatus according to claim 21, further comprising calculating means for calculating a transfer function realising a required reproduction characteristic;

wherein said conversion means converts said first digital image data into said second digital image data by applying said transfer function to said first digital image data.

24. The apparatus according to claim 21, wherein said first digital data and said second digital data are defined in the R-G-B coordinate system, wherein the conversion means is operable to define on the basis of said reproduction characteristic, a transfer function for processing said first digital data in the R-G-B coordinate system, and convert within the R-G-B coordinate system, said first digital image data into said second digital image data, using said transfer function.

25. The apparatus according to claim 23, wherein the compensation means is provided with a look-up table for storing the transfer function.

26. The apparatus according to claim 21, also comprising an analysis unit for analyzing digital image data generated by the scanner and for preselecting a reproduction characteristic on the basis of the analysis, wherein the characteristic means is operable to set at least one of said shoulder points based upon a change of an input luminance value preselected by the analysis unit.

* * * * *